March 15, 1932.  A. C. WOOD  1,849,128
COMBINATION MEASURING DEVICE
Filed July 7, 1928  2 Sheets-Sheet 1
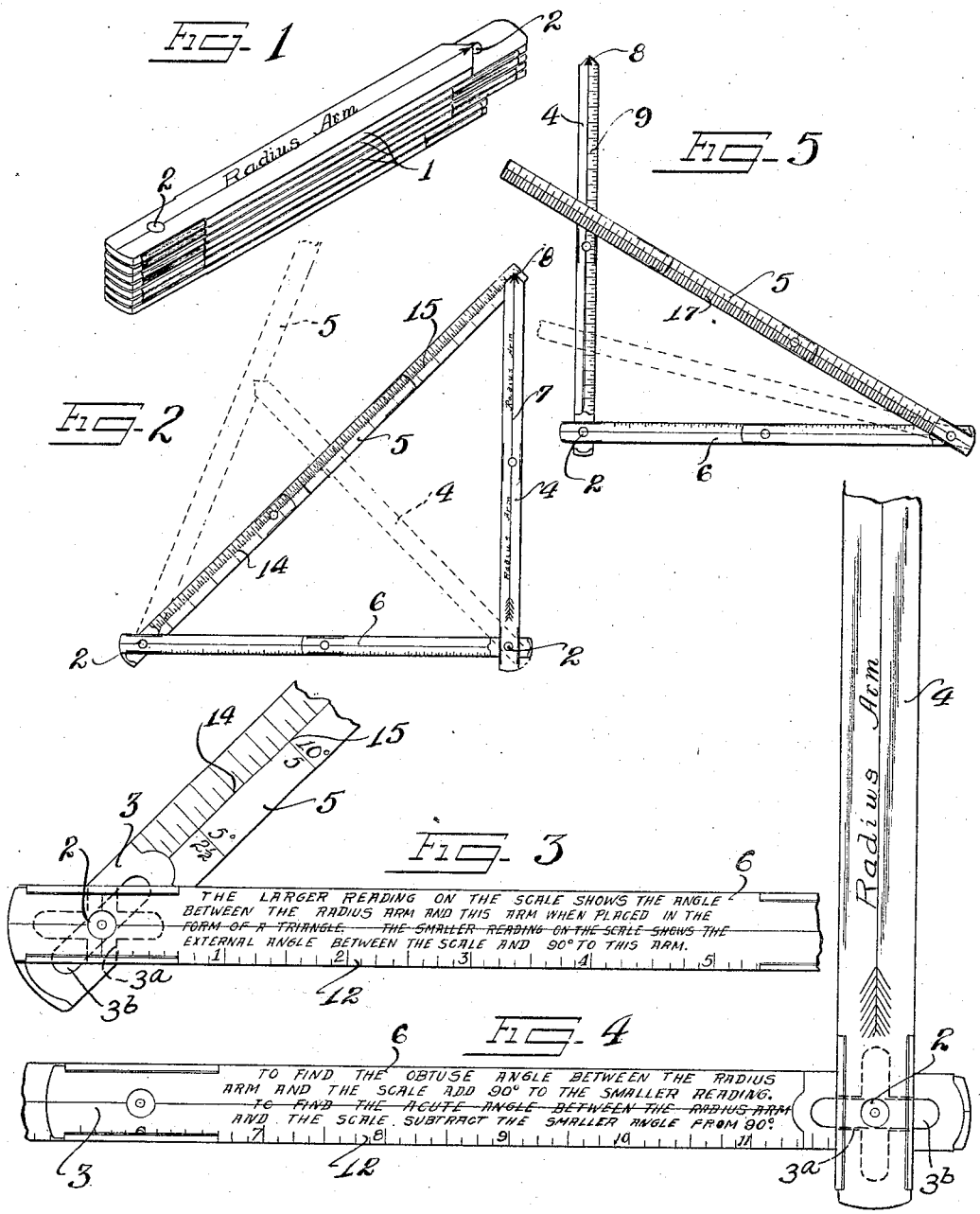
Inventor
Andrew C. Wood March 15, 1932.  A. C. WOOD  1,849,128
COMBINATION MEASURING DEVICE
Filed July 7, 1928  2 Sheets-Sheet 2
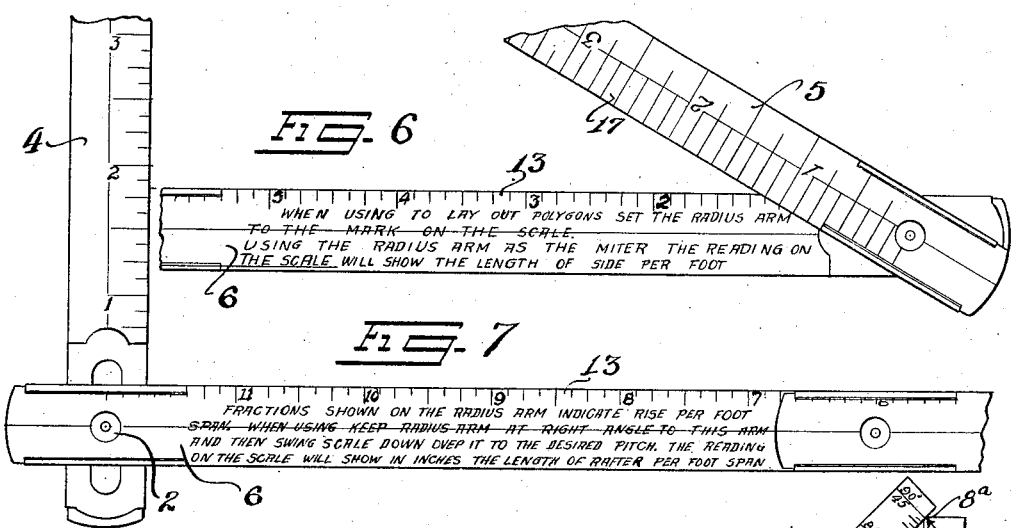
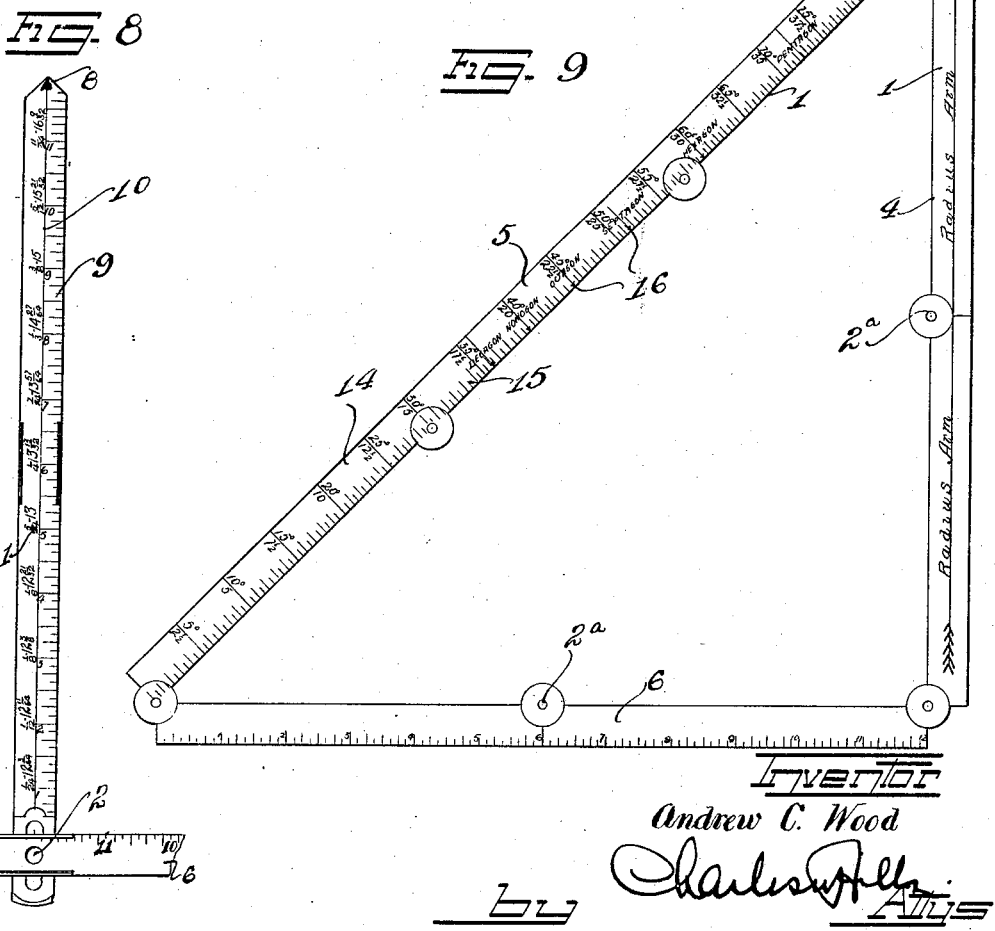
Inventor
Andrew C. Wood Patented Mar. 15, 1932

1,849,128

UNITED STATES PATENT OFFICE

ANDREW C. WOOD, OF CHICAGO, ILLINOIS

COMBINATION MEASURING DEVICE

Application filed July 7, 1928. Serial No. 290,984.

This invention relates to improvements in a combination measuring device, and more particularly to a device which may be used for measuring or laying out angles, lineal dimensions, polygons, slopes, angular relations between various planes or lines, and for various other purposes in various manners, as will be apparent to one skilled in the art, the device being highly desirable for use by engineers, carpenters, draftsmen, teachers, mathematicians, and many others of various professions and trades.

In the past, many and varied devices have been evolved for performing a great number of functions regarding angular and linear measurements, but these formerly known devices have in most instances proven objectionable, in that they were either too large and unwieldly to be conveniently packed in small places, or they necessitated adjustments by means of thumb screws and other mechanical locking devices, which are always objectionable due to the time required by the same, and frequently they were of such construction and of necessity made of such material that they were, more than desirably, susceptible to injury by contact with surrounding articles, which injury oftentimes was not apparent at first blush but would materially effect the result possibly after the damage was done. Further, devices of this type heretofore known, in most cases, were not operable with desirable facility, and not infrequently the results obtainable from them were too small in number and necessitated the use of supplementary or auxiliary parts and devices. Moreover, in most cases, these formerly known devices were prohibitively expensive, due to their complicated structure, for universal and common uses.

The present invention has been designed to overcome the above noted defects and objections in the provision of a measuring device suitable for measuring or determining angles, lines, lineal measurements, polygons, slopes, etc., and which may be used for any or all of its functions, easily and rapidly, without detracting to any extent from the desired accuracy.

The invention also seeks to provide a device of the character described, which is foldable into extremely compact form occupying very little space, and which may be easily packed in a container with other articles or wheresoever desired.

Another important object of the present invention is to provide a device of the character described, which is constructed in such a manner that it is enabled to withstand injury, especially that injury resulting from contact with other articles.

A further object of the present invention is to provide a measuring device which performs a relatively large number of functions which are brought about by simple and easy adjustments, the device being readily usable in practically any place and under practically any conditions.

While some of the more salient features, characteristics, and advantages, of a device embodying the present invention have been above pointed out, others will become apparent from the following disclosures.

The invention includes these and other features of construction and combinations of parts hereinafter described, and shown in a preferred form in the drawings, as more particularly indicated by the claims.

On the drawings:

Figure 1 is a perspective view of a device embodying principles of the present invention, shown in folded or compact form.

Figure 2 is a reduced view showing the device of Figure 1, in extended position and indicating the operation of the same.

Figure 3 is an enlarged fragmentary view of the lower left hand portion of Figure 2.

Figure 4 is a view similar to Figure 3 of the lower right hand portion of Figure 2.

Figure 5 is a view similar to Figure 2, taken from the opposite side of the device.

Figure 6 is an enlarged fragmentary view of the lower right hand portion of Figure 5.

Figure 7 is a view similar to Figure 6, of the lower left hand portion of Figure 5.

Figure 8 is a fragmentary view, with parts omitted, of the left hand portion of Figure 5.

Figure 9 is an enlarged view similar to

Figure 2, showing a modified form of the present invention.

As shown in the drawings:

The embodiment of the present invention, selected merely as one means for adequately disclosing the same, embodies a plurality of relatively short segments or sections 1 hinged one to the other, as indicated at 2, and provided at each junction point with the customary frictional detents or holding means 3, as embodied in the commonly known folding carpenter's rule. Sections 1 are foldable into very compact juxtaposed formation, as shown more clearly in Figure 1, and are made preferably of brass or bronze, but, of course, may be formed from any desirable material.

In utilizing the present invention, the smaller sections 1 are preferably extended and pivoted so as to form three distinct arms, namely, a radius arm 4, a scale arm 5, and an arm 6 pivoted adjacent an end thereof to each of the radius and scale arms which, for the purpose of convenience, will be designated a span arm. In most instances, the radius arm 4 incorporates two of the sections 1 and is provided on one side thereof with a locus line 7 which terminates in an index point 8 at the outer extremity of the arm and designated, in this instance, by an arrow head. The arm is also preferably labeled thereon with the legend "Radius arm". On its opposite side the radius arm is provided with a linear scale 9 (Figure 8) preferably in inches and fractions thereof, a locus line 10, and a pitch scale 11 incorporating various fractions designating pitches of sloping constructions, each such fraction being accompanied by linear indicia which denotes the length of the sloping member or hypotenuse of a right triangle formed as indicated in Figure 5, the radius arm being at 90° to the span arm, and the scale overlying the radius arm so that the locus line theron will correspond with any of the pitch indicia on the radius arm.

The span arm 6 is preferably of the same length as the radius arm 4 and incorporates as many sections 1 as does the radius arm. The span arm bears two legends on one side thereof, in the present instance, one legend being on each section of the span arm and also a linear scale 12 adjacent the outer margin of the arm. As shown more clearly in Figures 3 and 4, the legends on each section of the span arm preferably read as follows: "The larger reading on the scale shows the angle between the radius arm and this arm when placed in the form of a triangle. The smaller reading on the scale shows the external angle between the scale and 90° to this arm,"—and—"To find the obtuse angle between the radius arm and the scale add 90° to the smaller reading. To find the acute angle between the radius arm and the scale subtract the smaller angle from 90°." On the opposite side thereof the span arm also bears a linear scale 13, in this instance, disposed adjacent the inner margin of the arm, and also bears two legends (Figures 6 and 7), "When using to lay out polygons, set the radius arm to the mark on the scale. Using the radius arm as the miter, the reading on the scale will show the length of the side per foot,"—and—"Fractions shown on the radius arm indicate a rise per foot span. When using keep radius arm at right angles to this arm and then swing scale down over it to the desired pitch. The reading on the scale will show in inches the length of rafter per foot span."

The scale arm 5 bears on one side thereof (shown more clearly in Figures 2 and 3) a locus line 14 and a scale 15 of indicia, proportionally graduated, indicating various sizes of angles, there being a large and small angle designated at each major cross line on the scale. On the same side the scale arm also bears a plurality of spaced points 16 (Figure 9) which are labeled with names of various polygons in accordance with their location on the scale. On the opposite side thereof the scale arm bears linear scale 17 preferably in inches and fractions thereof, a locus line, and spaced points designated with the names of polygons.

In the use of the present invention, the device is extended to form the arms 4, 5, and 6, and the radius arm 4 and the scale arm 5 are preferably adjusted relatively to each other and to the span arm 6, the latter remaining stationary with respect to the other arms, to produce the various results obtainable by the device. The arms are maintained at any position of adjustment by means of the frictional holders 3 which are provided with an additional transverse groove 3a, Figures 3 and 4, which, when in registration with the tongue 3b, will distinctly locate the respective arms at 90° to each other. The radius arm and span arm are preferably of equal length and, for the sake of convenience, have been designated as a unit length or 12 inches. The scale arm is preferably of sufficient length to form the hypotenuse of a right angle triangle when the radius arm is 90° to the span arm, as seen in Figure 2.

The present invention is very easily operated with great accuracy. For instance, assuming the arms to be in the position shown by the full lines in Figure 2, if it is desired to lay out any angle between the radius arm and span arm, the radius and scale arms are pivoted until the index point 8 corresponds with the number designating the desired angle on the scale 15 on the scale arm. The radius arm is then at an angle to the span arm corresponding to the larger of the two adjacent numbers on the scale arm. The smaller of these numbers subtracted from 90° equals the interior angle adjacent the scale arm between the scale and radius arms, and the smaller number plus 90° gives the supplement of the aforesaid adjacent angle. The smaller number also directly gives the value in degrees of the complement to the interior angle between the scale and span arms, which interior angle is obviously equal to the aforesaid adjacent angle. Obviously, to find the value of an angle it is simply necessary to reverse the above process.

Assuming it is desired to produce a portion of a regular polygon, the radius and scale arms are adjusted until the index point 8 coincides with the point 16 on the scale arm labeled with the name of the desired polygon. When so arranged, the arms will define two radii and a chord of a circumscribing circle around the polygon; the two radii being the miter and the chord being the length of one side of the polygon in inches per foot miter.

Assuming now it is desired to find the proper slope and determine the length of a rafter in a roof span, the device is used with the opposite side thereof facing the operator. The radius arm is set at 90° to the span arm. The scale arm is then moved over the radius arm until the locus line on the scale arm coincides with the desired pitch fraction on the radius arm. The linear reading on the span arm will be proportional to the length of the horizontal beam in a roof span. The linear reading on the radius arm will designate the rise in inches per foot span of the rafter corresponding to the scale arm. The scale arm reading adjacent the pitch fraction on the radius arm will give the proportional lineal dimension of the aforesaid rafter. Assuming, for instance, that the horizontal beam in ½ the roof span is but 20 feet long and it is desired to know the length of the rafter at a certain pitch thereto. In view of the fact that the span arm is marked in inches, a suitable scale is readily apparent, namely, ½ inch equals 1 foot, the horizontal beam being taken, therefore, as a length of 10 inches on the span arm. When the scale arm is adjusted to a position coinciding with the desired pitch, the lineal dimension on the scale arm, in proportion, of course, clearly coincides with a perpendicular from the ten inch mark on the span arm and will designate the length of the desired rafter. Obviously, a reversal of the above process will determine values of the different parts of sloping constructions already made, and, of course, the device is applicable to the determination of values relating to any sloping constructions including roof spans, stairways, etc.

It is clearly apparent that the device may also be used as a square, tri-square, bevel, as an ordinary rule, and in many other determinations, as will be apparent to one skilled in the art, the above noted examples being deemed sufficient to properly disclose the operation of the device herein.

In Figure 9, I have illustrated a slightly modified form of the present invention wherein all of the smaller sections 1 are joined one to the other by means of offset friction hinges 2a, the central line through the pivot point of the hinges coinciding with the inner edge of each of the arms. The arms are identical in every respect to those previously described herein with the exception that the index point 8a on the radius arm 4 is offset to coincide with the inner corner of this arm and this corner is made to coincide with the desired reading abutting the inner edge of the scale arm, whereby very clear determinations may be made for highly accurate work.

From the foregoing it will be apparent that I have provided a combination measuring device which may be operated with great facility and accuracy, which is formed in such a manner as to preclude injury thereto by contact with the surrounding articles, which may be folded into exceedingly compact form and which may be very economically manufactured.

I am aware that many changes may be made and numerous details of construction may be varied through a wide range without departing from the principles of this invention and I, therefore, do not purpose limiting the patent granted hereon otherwise than necessitated by the prior art.

I claim as my invention:

1. As an article of manufacture, a device of the character described including a span arm bearing lineal indicia thereon, a scale arm bearing lineal indicia and a locus line pivoted to said span arm adjacent an end thereof, a radius arm bearing lineal and pitch indicia thereon pivoted to said span arm adjacent the opposite end thereof, whereby said radius arm may be positioned at right angles to said span arm, and said scale arm moved so that said locus line is in juxtaposed relationship with any of said pitch indicia whereupon the rise and slope length per unit of span will be indicated by the lineal indicia on said radius arm and said scale arm respectively.

2. As an article of manufacture, a device of the character described including a scale arm bearing angular graduations and indicia, a radius arm bearing an index point, and a third arm having its opposite ends pivoted respectively to said scale and radius arms at points adjacent an end of each in such a manner that, when said index point coincides with the graduation on said scale arm to form a triangle, the indicia thereon will denote the value of the angle opposite the scale arm, and the angle between a perpendicular to the scale arm and one of said other arms, this latter angle being the complement of either of the interior angles adjacent the scale arm.

3. As an article of manufacture, a device of the character described including a scale arm bearing angular graduations and indicia, a second arm pivoted to one end of said scale arm, and a radius arm pivoted to the other end of said second arm and having an index point spaced from its pivotal connection a distance corresponding to the length of said second arm between pivot points, said scale arm and radius arm being adjustable in such a manner that when said index point coincides with a graduation on said scale arm to form a triangle, the indicia on said scale arm will denote respectively the value of the angle opposite the scale arm, and the angle between the radius arm or second arm and a perpendicular to the scale arm.

In testimony whereof I have hereunto subscribed my name at Chicago, Cook County, Illinois.

ANDREW C. WOOD.